US011640892B2

(12) United States Patent
Nakajima et al.

(10) Patent No.: US 11,640,892 B2
(45) Date of Patent: May 2, 2023

(54) FUSE ELEMENT AND PROTECTIVE ELEMENT

(71) Applicant: SCHOTT Japan Corporation, Koka (JP)

(72) Inventors: Shintaro Nakajima, Koka (JP); Tsuyoshi Hattori, Koka (JP)

(73) Assignee: SCHOTT JAPAN CORPORATION, Shiga (JP)

( * ) Notice: Subject to any disclaimer, the term of this patent is extended or adjusted under 35 U.S.C. 154(b) by 86 days.

(21) Appl. No.: 17/274,280

(22) PCT Filed: Dec. 26, 2019

(86) PCT No.: PCT/JP2019/051212
§ 371 (c)(1),
(2) Date: Mar. 8, 2021

(87) PCT Pub. No.: WO2020/138325
PCT Pub. Date: Jul. 2, 2020

(65) Prior Publication Data
US 2021/0343494 A1    Nov. 4, 2021

(30) Foreign Application Priority Data

Dec. 28, 2018 (JP) .............................. JP2018-247934
Oct. 31, 2019 (JP) .............................. JP2019-198126

(51) Int. Cl.
*H01H 85/06* (2006.01)
*H01H 85/143* (2006.01)
(Continued)

(52) U.S. Cl.
CPC ............. *H01H 85/06* (2013.01); *C22C 13/00* (2013.01); *C22C 13/02* (2013.01); *H01H 71/02* (2013.01);
(Continued)

(58) Field of Classification Search
CPC ........ H01H 85/06; H01H 71/02; H01H 85/11; H01H 85/143; H01H 85/0047; C22C 13/00; C22C 13/02
(Continued)

(56) References Cited

U.S. PATENT DOCUMENTS 2,864,917 A * 12/1958 Sundt ................... H01H 85/046
337/296
2,911,504 A * 11/1959 Cohn ................... H01G 9/0003
337/296
(Continued)

FOREIGN PATENT DOCUMENTS

JP        11-151591 A     6/1999
JP      2000-306477 A    11/2000
(Continued)

OTHER PUBLICATIONS

JP_2013239405_A_English_Translation (Year: 2013).*
(Continued)

*Primary Examiner* — Anatoly Vortman
(74) *Attorney, Agent, or Firm* — Keating and Bennett, LLP (57) ABSTRACT

A protective element includes an insulating substrate, a plurality of electrodes provided on the insulating substrate, a fuse element electrically connected to any electrode of the plurality of electrodes, and a heat generation element provided on the insulating substrate for heating and fusing the fuse element. The fuse element contains a composite metal material in which a first fusible metal and a second fusible metal are stacked, some of a component of the first fusible metal being dissolved at a joint working temperature, the second fusible metal being lower in melt temperature than (Continued)

the first fusible metal, at least some of a component of the second fusible metal being molten at the joint working temperature.

11 Claims, 4 Drawing Sheets

(51) Int. Cl.
　　*H01H 71/02* (2006.01)
　　*C22C 13/02* (2006.01)
　　*C22C 13/00* (2006.01)
　　*H01H 85/11* (2006.01)
　　*H01H 85/00* (2006.01)
(52) U.S. Cl.
　　CPC .......... *H01H 85/11* (2013.01); *H01H 85/143* (2013.01); *H01H 85/0047* (2013.01)
(58) Field of Classification Search
　　USPC ........................................................ 337/142
　　See application file for complete search history.

(56) References Cited

U.S. PATENT DOCUMENTS

| | | | | |
|---|---|---|---|---|
| 4,320,374 A * | 3/1982 | Narancic | ............. | H01H 85/055 337/296 |
| 5,099,218 A * | 3/1992 | Salisbury | ............. | H01H 85/055 337/296 |
| 5,898,357 A * | 4/1999 | Endo | ...................... | H01H 85/11 337/159 |
| 5,900,798 A * | 5/1999 | Hanazaki | ............. | H01H 85/11 337/159 |
| 5,982,268 A * | 11/1999 | Kawanishi | ........... | H01H 85/044 337/231 |
| 6,064,293 A * | 5/2000 | Jungst | ................. | H01H 37/761 337/296 |
| 6,075,434 A * | 6/2000 | Rueckling | ............. | H01H 85/11 337/296 |
| 6,384,708 B1 * | 5/2002 | Jollenbeck | ......... | H01H 85/0411 439/890 |
| 6,452,475 B1 * | 9/2002 | Kawazu | ............... | H05K 1/0293 337/296 |
| 6,566,995 B2 * | 5/2003 | Furuuchi | ............. | H01L 23/5256 337/182 |
| 6,774,761 B2 * | 8/2004 | Tanaka | ................. | H01H 37/761 337/296 |
| 6,791,448 B2 * | 9/2004 | Kaltenborn | ............ | H01H 85/11 337/159 |
| 6,819,215 B2 * | 11/2004 | Tanaka | ................. | H01H 37/761 337/296 |
| 6,838,971 B2 * | 1/2005 | Senda | ................. | H01H 37/761 337/296 |
| 6,963,264 B2 * | 11/2005 | Iwamoto | ............. | H01H 37/761 337/296 |
| 7,038,569 B2 * | 5/2006 | Hamada | ............... | H01H 37/761 337/296 |
| 7,042,327 B2 * | 5/2006 | Tanaka | .................... | C22C 12/00 337/296 |
| 7,064,648 B2 * | 6/2006 | Tanaka | ................. | H01H 37/761 337/296 |
| 7,109,839 B2 * | 9/2006 | Etschmaier | ............ | H01H 85/11 337/296 |
| 7,119,653 B2 * | 10/2006 | Ohtsuka | .................. | H01H 85/10 337/161 |
| 7,142,088 B2 * | 11/2006 | Tanaka | ................. | H01H 37/761 337/296 |
| 7,173,510 B2 * | 2/2007 | Kono | ..................... | H01H 37/76 337/159 |
| 7,199,697 B2 * | 4/2007 | Tanaka | ................. | H01H 37/761 337/159 |
| 7,268,661 B2 * | 9/2007 | Li | .......................... | H01H 85/38 337/296 |
| 7,286,037 B2 * | 10/2007 | Furuuchi | .............. | H01H 85/046 337/296 |
| 7,385,475 B2 * | 6/2008 | Bender | .............. | H01H 85/0047 337/228 |
| 7,436,284 B2 * | 10/2008 | Bender | .............. | H01H 85/0047 337/228 |
| 8,976,001 B2 * | 3/2015 | Chen | .................... | H01H 85/055 337/182 |
| 10,008,356 B2 * | 6/2018 | Yoneda | ................. | H01H 37/761 |
| 2010/0176910 A1 * | 7/2010 | Knab | ................... | H01H 37/761 337/290 |
| 2011/0163840 A1 * | 7/2011 | Lu | ........................ | H01H 69/022 337/296 |
| 2012/0107651 A1 | 5/2012 | Hotta et al. | | |
| 2015/0084734 A1 | 3/2015 | Yoneda | | |
| 2015/0130585 A1 * | 5/2015 | Nakajima | ............ | H01H 37/761 337/413 |
| 2016/0013001 A1 * | 1/2016 | Yoneda | .................. | H01H 85/06 337/290 |

FOREIGN PATENT DOCUMENTS

| | | |
|---|---|---|
| JP | 2002-184282 A | 6/2002 |
| JP | 2008-130697 A | 6/2008 |
| JP | 2012-099307 A | 5/2012 |
| JP | 2013-229295 A | 11/2013 |
| JP | 2013-239405 A | 11/2013 |
| JP | 2015-079608 A | 4/2015 |
| JP | 6420053 B2 | 11/2018 |

OTHER PUBLICATIONS

English translation of the International Search Report of the International Searching Authority for International Application PCT/JP2019/051212, dated Mar. 24, 2020, 2 pages, Japan Patent Office, Tokyo, Japan.

PCT International Preliminary Report on Patentability including English Translation of PCT Written Opinion of the International Searching Authority for International Application PCT/JP2019/051212, dated Jun. 16, 2021, 8 pages, International Bureau of WIPO, Geneva, Switzerland.

\* cited by examiner

FUSE ELEMENT AND PROTECTIVE ELEMENT

BACKGROUND OF THE INVENTION

1. Field of the Invention

The present disclosure relates to a fuse element and a protective element including the fuse element.

2. Description of the Related Art

With rapid spread of small electronic devices such as mobile devices in recent years, a protective element that is smaller in size and thickness is mounted on a protective circuit for a mounted power supply. For example, for a protective circuit for a secondary battery pack, a chip protective element for a surface mount device (SMD) is suitably used. The chip protective element includes a one-shot protective element that senses excessive heat generation caused by an overcurrent in a protected device and blows a fuse to cut off an electric circuit under a prescribed condition. An example of a different type of chip protective element includes a one-shot protective element that blows a fuse to cut off an electric circuit under a prescribed condition in response to an abnormal increase in ambient temperature.

When the protective circuit senses an abnormal condition that occurs in the device, the protective element has a resistive element that generates heat by a signal current. The protective element ensures the safety of the device by cutting off the circuit by fusing a fuse element composed of an alloy material fusible by the generated heat or cutting off the circuit by fusing the fuse element with an overcurrent.

For example, Japanese Patent Laying-Open No. 2013-239405 discloses a protective element in which a resistive element that generates heat at the time of occurrence of an abnormal condition is provided on an insulating substrate such as a ceramic substrate.

A fusible alloy that makes up the fuse element of the protective element described above recently tends to be lead-free in order to follow stronger regulations on chemical substances under an amended RoHS directive or the like. For example, a fuse element composed of a lead-free metal composite material described in Japanese Patent Laying-Open No. 2015-079608 is available. The fuse element is composed of a low-melting-point metal material fusible at a soldering working temperature during surface mounting of the protective element on a circuit substrate, and a high-melting-point metal material in a solid phase that can be dissolved into the low-melting-point metal material in a liquid phase at the soldering working temperature. The low-melting-point metal material and the high-melting-point metal material of the fuse element are integrally formed. In the fuse element, the low-melting-point metal material that has been converted to the liquid phase can be held with the use of the high-melting-point metal material in the solid phase until the soldering work is completed.

The low-melting-point metal material and the high-melting-point metal material of the fuse element are secured to each other. While the low-melting-point metal material that has been converted to the liquid phase by heat during soldering is held without being fused by the high-melting-point metal material in the solid phase at the soldering working temperature, the fuse element can be joined to an electrode pattern of the protective element with the low-melting-point metal material in the liquid phase. Furthermore, fusing of the fuse element at the soldering working temperature during surface mounting of the protective element on the circuit substrate is prevented. The protective element performs a fusing operation by having a contained resistive element generate heat to diffuse or dissolve with heat the high-melting-point metal material of the fuse element into the low-melting-point metal material serving as a medium.

An electrical resistance value of the protective element that serves to cut off a current through a power line is preferably as small as possible because loss of electric energy is small. In this regard, a fuse element containing a high-melting-point metal material composed of silver representing a material low in electrical resistance is very advantageous.

The high-melting-point metal material composed of silver, however, does not melt at an operating temperature of the protective element. Therefore, the high-melting-point metal material does not sufficiently dissolve or diffuse into the low-melting-point metal material and may remain as a thick film. In this case, in a conventional fuse element, excessive time has been required for fusing, and in an extreme example, fusing may be defective. For such reasons, a thickness of the high-melting-point metal material has not been sufficiently large for lowering an electrical resistance value.

With reduction in the size and thickness of a fuse element, an electrode, and a substrate of the protective element, when a fuse element smaller in thickness is employed, a high-melting-point metal material cannot have a large thickness. Therefore, in joining a fuse element to an electrode pattern, the high-melting-point metal material is excessively diffused or dissolved in the low-melting-point metal material in the liquid phase and becomes small in thickness. In this case, the fuse element may deform or a surface of the high-melting-point metal material may become wavy, which may interfere with attachment of the protective element.

SUMMARY OF THE INVENTION

An object of the present disclosure is to provide a fuse element that conforms with regulations on chemical substances, having a low electrical resistance, and achieving a reduction in size and thickness of a protective element, the fuse element being capable of more reliably cutting off current conduction at the time of an operation of fusing, and a protective element including the same.

According to the present disclosure, a fuse element including a composite metal material in which a first fusible metal and a second fusible metal are stacked is provided, some of an element of the first fusible metal is molten at a reflow temperature, the second fusible metal has a lower melt temperature than the first fusible metal, and at least some of an element of the second fusible metal is molten at the reflow temperature.

Some of an element of the first fusible metal is molten at a reflow temperature and some or all of an element of the second fusible metal is molten at the same reflow temperature. A prescribed element of the first fusible metal and second fusible metal is mixed therebetween so that the first and second fusible metals are closer to prescribed respective liquidus temperatures. With the fuse element according to the present disclosure, the fuse element can be joined by a reflow method without using a joint material such as a solder paste. Since the fuse element is composed of fusible metals, it is free from a residue that remains without being fused. Furthermore, the fuse element can be lowered in electrical resistance without using a high-melting-point metal material composed of silver. There is no concern about deformation or waviness of a surface of the fuse element, which contributes to more economically efficient production.

According to a different aspect of the present disclosure, a protective element including the fuse element is provided. Specifically, the protective element according to the present disclosure includes an insulating substrate, a plurality of electrodes provided on the insulating substrate, a fuse element electrically connected to any of the plurality of electrodes, and a heat generation element provided on the insulating substrate, wherein the heat generation element is configured to heat and fuse the fuse element. The fuse element contains a composite metal material in which a first fusible metal and a second fusible metal are stacked, some of an element of the first fusible metal is molten at a reflow temperature, the second fusible metal having a lower melt temperature than the first fusible metal, and at least some of an element of the second fusible metal is molten at the reflow temperature.

With the fuse element and the protective element according to the present disclosure, current conduction can more reliably be cut off at the time of an operation of a fuse.

DETAILED DESCRIPTION OF THE PREFERRED EMBODIMENTS

Figure 1A:
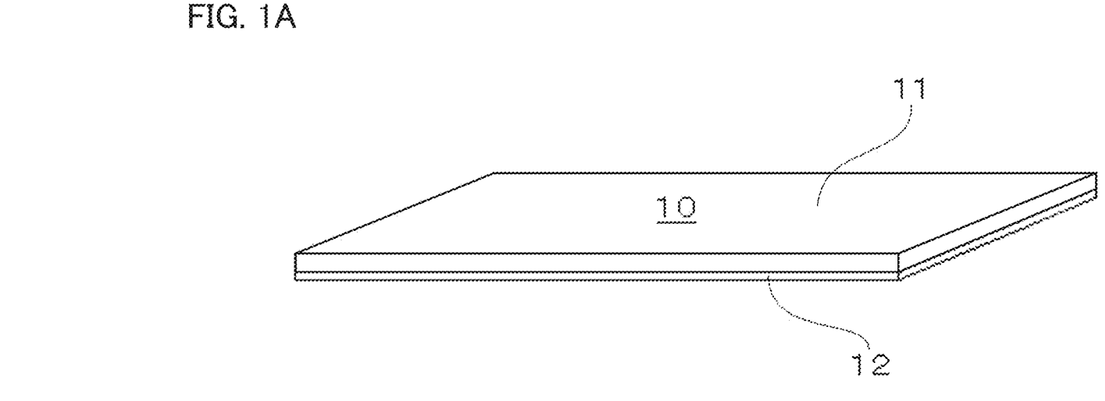
FIGS. 1A and 1B are perspective views showing a fuse element according to an embodiment of the present disclosure.
Figure 1B:
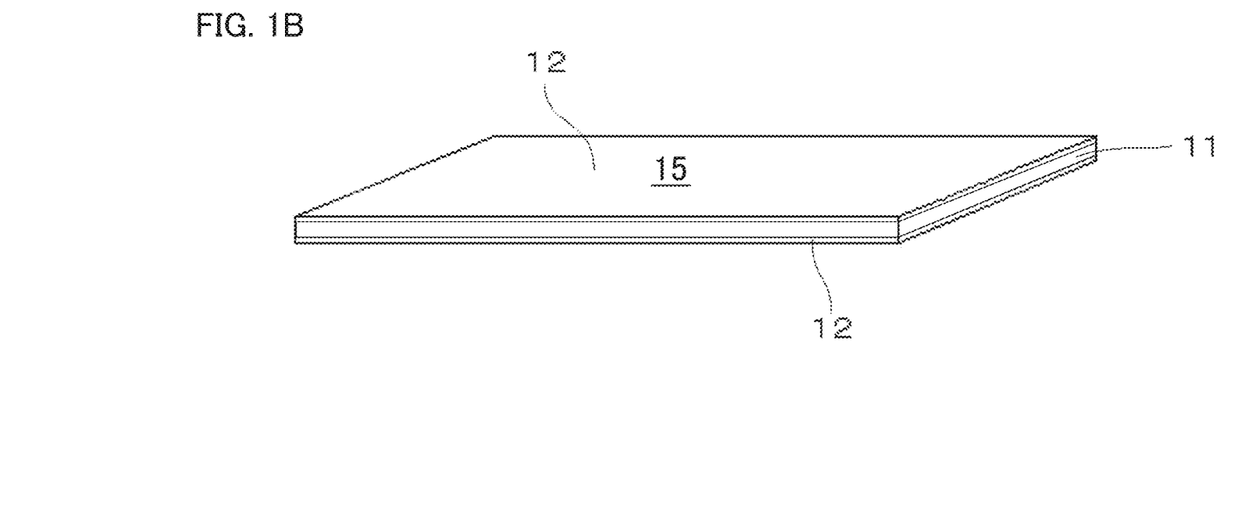

A fuse element 10 according to the present disclosure is composed of a composite metal material in which a first fusible metal 11 and a second fusible metal 12 are stacked as shown in FIGS. 1A and 1B. Some of an element of the first fusible metal 11 is molten at a reflow temperature, the second fusible metal 12 has a lower melt temperature than the first fusible metal 11, and at least some of an element of the second fusible metal 12 is molten at the reflow temperature.

Some of the element of the first fusible metal 11 is molten into the second fusible metal 12 at the reflow temperature. The first fusible metal 11 and the second fusible metal 12, when some or all of an element of the second fusible metal 12 is molten at the reflow temperature, are diffused into or mixed with each other. As a result of this diffusion or mixing, the first fusible metal 11 and the second fusible metal are closer to prescribed respective liquidus temperatures.

Examples of the first fusible metal 11 of the fuse element include an 80 Sn-20 Ag alloy (having a liquidus temperature of 370° C. and a solidus temperature of 221° C.) Examples of the second fusible metal 12 include a 60 Sn-40 Bi alloy (having a liquidus temperature of 175° C. and a solidus temperature of 139° C.). The fuse element 10 is composed of a composite metal material in which the second fusible metal 12 is stacked on a surface of the first fusible metal 11. The solidus temperature and the liquidus temperature are derived from differential scanning calorimetry (DSC).

Though the first fusible metal is not particularly limited, for example, it should only be a lead-free tin-based solder material, in which some of an element of the lead-free tin-based solder material is molten at a prescribed reflow temperature that exceeds the solidus temperature of the second fusible metal and is lower than the liquidus temperature of the first fusible metal (preferably, a peak temperature being lower than approximately 300° C. in view of the heat resistance of a peripheral element).

The second fusible metal should only be tin or a lead-free tin-based solder material, in which some or all of an element of the second fusible metal is molten at the prescribed reflow temperature. Alternatively, the second fusible metal 12 may be composed of a metal alone having a single melting point, a eutectic alloy, or an alloy having a melt range. In addition to the examples described previously, an Sn—Cu alloy, an Sn—Sb alloy, an Sn—Zn alloy, and an Sn—Al alloy are available as the first fusible metal. Similarly, Sn, an Sn—Ag alloy, an Sn—Ag—Cu alloy, an Sn—Ag—Cu—Bi alloy, an Sn—Cu alloy, an Sn—In alloy, an Sn—Ag—In alloy, an Sn—Bi—Ag alloy, an Sn—Ag—Bi—In alloy, an Sn—Sb alloy, an Sn—Zn alloy, an Sn—Zn—Bi alloy, and an Sn—Al alloy are available as other second fusible metals.

The first fusible metal and the second fusible metal are each a lead-free metal material that is high in Sn content and disadvantageously more prone to oxidation than a conventional lead-containing metal material. Therefore, at least one of P, Ga, and Ge as a trace element for prevention of oxidation may be added to any one or both of the first fusible metal and the second fusible metal at a concentration exceeding 3 ppm and lower than 300 ppm.

When the first fusible metal 11 is in a shape of a flat plate, a fuse element 10 in which the second fusible metal 12 is stacked on one of the plate surfaces of the first fusible metal 11 shown in FIG. 1A is applicable. Alternatively, a fuse element 15 in which the second fusible metal 12 is stacked on both of the plate surfaces of the first fusible metal 11 shown in FIG. 1B is applicable.

Means for stacking the second fusible metal 12 on the first fusible metal 11 is not particularly limited and the second fusible metal 12 should only be stacked on the first fusible metal 11. For example, means such as cladding (compression bonding), plating, and melt coating is available.

The fuse element according to the present disclosure can directly be placed on an electrode without using a solder paste and joined to the electrode by a reflow method. Since the fuse element is composed of a fusible metal, it is free from a residue that remains without being fused. More specifically, a high-melting-point metal material composed of silver has conventionally been used, however, the high-melting-point material composed of silver did not melt at an operating temperature of the protective element. In the fuse element in the present embodiment, the first fusible metal 11 and the second fusible metal 12 are both fusible at the operating temperature of the protective element. Therefore, such a defective operation in which a part of the fuse element remains without being fused as seen in a conventional fuse element can be prevented. A numeric value preceding a chemical symbol in denotation of a composition of an alloy such as an 80 Sn-20 Ag alloy herein represents mass % of the element.

Figure 2:
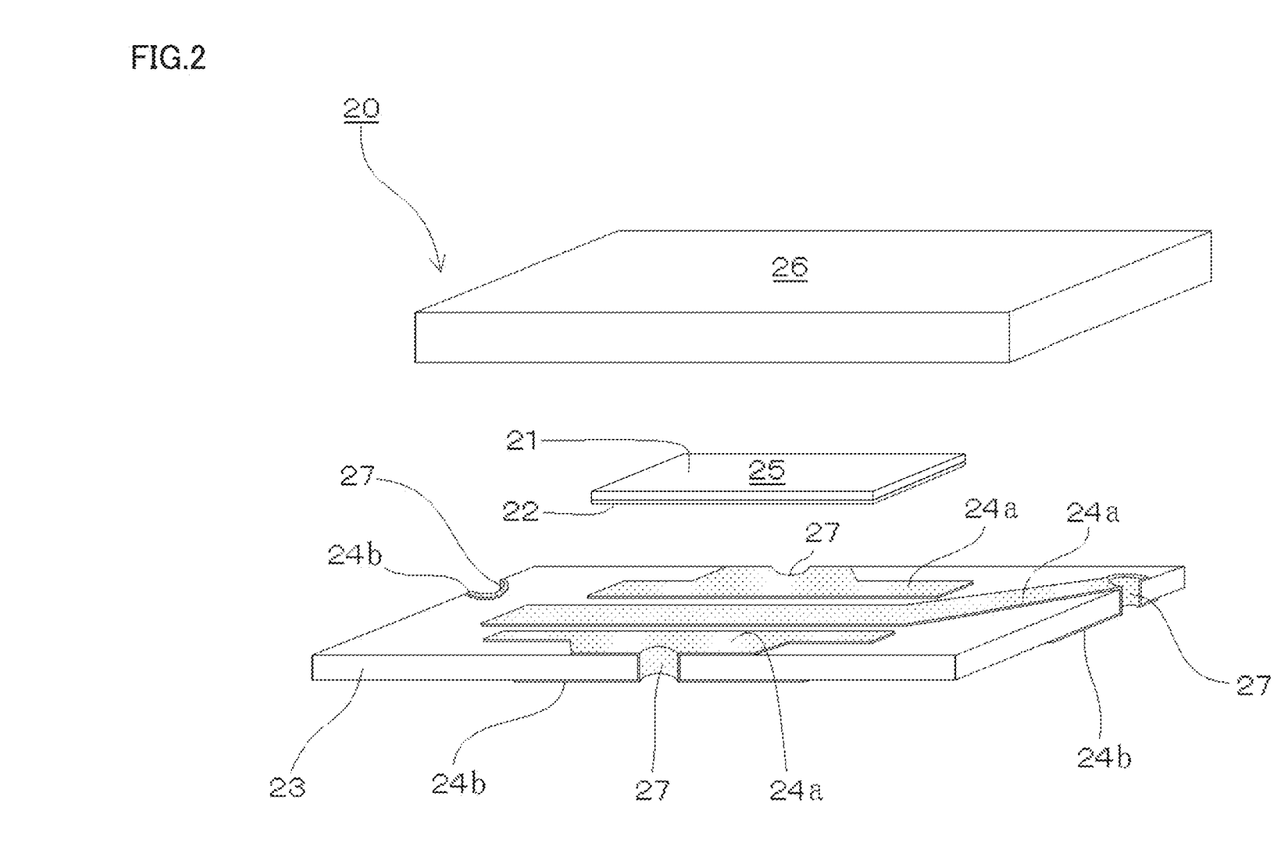
FIG. 2 is an exploded perspective view showing a protective element according to an embodiment of the present disclosure.

The fuse element according to the present disclosure is joined by melting to an electrode 24a made from an electrically conductive member provided on a heat-resistant insulating substrate 23 a fuse element 25 of the protective element as shown in FIG. 2. The reflow temperature is desirably set to exceed the solidus temperature of the second fusible metal and be lower than the liquidus temperature of the first fusible metal.

The fuse element 25 and electrode 24a are joined to each other in the steps below. Flux for a joint is applied at least to a surface of electrode 24a to which the fuse element 25 is to be joined and at least to a surface of a second fusible metal 22 of the fuse element 25. The fuse element 25 is placed such that the second fusible metal 22 is in contact with the electrode 24a. The fuse element 25 and the insulating substrate 23 are heated to the reflow temperature to thereby melt some of the first fusible metal 21 and some or all of the second fusible metal 22 and join the fuse element 25 to the electrode 24a.

Thereafter, fusing flux for operation is applied to at least the fuse element 25, and the fuse element 25 to which fusing flux has been applied is covered with and packaged in a cap-shaped lid 26 together with the insulating substrate 23 to thereby assemble a protective element 20.

Examples of the first fusible metal 21 of the fuse element 25 include an 80 Sn-20 Ag alloy (having a liquidus temperature of 370° C. and a solidus temperature of 221° C.) Examples of the second fusible metal 22 include a 60 Sn-40 Bi alloy (having a liquidus temperature of 175° C. and a solidus temperature of 139° C.). In this example, as a result of the joint operation, at the reflow temperature, some of an element of the first fusible metal 21 is diffused into or mixed with the second fusible metal 22, and some or all of an element of the second fusible metal 22 is molten at the reflow temperature. As a result of diffusion or mixing, the first fusible metal 21 and the second fusible metal 22 are closer to prescribed liquidus temperatures.

In the first fusible metal 21, Sn transfers from the second fusible metal 22 as a result of diffusion in the liquid phase, is closer to an equilibrium state, and hence an amount of the Sn element increases. Ag also transfers to the second fusible metal 22 as a result of the diffusion, and the Ag concentration lowers. Consequently, the Ag concentration in first fusible metal 21 relatively lowers, and the liquidus temperature lowers from 370° C. in the initial state toward the solidus temperature of 221° C.

In the second fusible metal 22, as a result of the diffusion of the first fusible metal 21, Sn moves into the first fusible metal 21, is closer to the equilibrium state, and hence an amount of the Sn element decreases. Bi also transfers to the first fusible metal 21 as a result of the diffusion and a Bi concentration lowers. Consequently, in the second fusible metal 22, the Bi concentration relatively decreases and the liquidus temperature starts to lower toward the solidus temperature of 139° C. The fuse element is joined and a difference between the liquidus temperature and the solidus temperature in the first fusible metal and the second fusible metal is reduced by making use of equilibrium displacement of the Sn element, which is an element common to the first fusible metal 21 and the second fusible metal 22, and mutual diffusion therebetween of Ag and Bi which are different elements so that a range of an operating temperature of the fuse is self-regulated.

The fuse element can more quickly be fused than a conventional fuse element fused by erosion of a solid pure silver coating thereof by an Sn-based lead-free solder. Since a silver coating is not used, there is no concern about defective fusing due to corrosion by sulfurization, silver migration, or residue of the silver coating.

Protective element 20 according to the present disclosure includes the fuse element, and as shown in FIG. 2, it includes the insulating substrate 23, a plurality of electrodes 24a and 24b provided on the insulating substrate 23, fuse element 25 electrically connected to a prescribed electrode (24a in FIG. 2) of electrodes 24a and 24b, and a heat generation element provided on the insulating substrate 23, for heating and fusing the fuse element 25, and electrically connected to a prescribed electrode (arranged on a rear surface of the insulating substrate 23 in FIG. 2). The fuse element 25 is composed of a composite metal material in which the first fusible metal 21 and the second fusible metal 22 are stacked, some of an element of the first fusible metal 21 is molten at the reflow temperature, the second fusible metal 22 has a lower melt temperature range than the first fusible metal 21, and at least some of an element of the second fusible metal 22 is molten at the reflow temperature. Electrode 24a includes a half through hole 27, the half through hole allowing electrical connection between pattern electrodes 24a, 24b on the upper and lower surfaces of the substrate.

The first fusible metal 21 of the fuse element 25 preferably has a liquidus temperature lower than a peak temperature of the heat generation element (a highest temperature that the heat generation element generates). Thus, for example, even though some of the first fusible metal 21 remains without being molten into the second fusible metal 22, the heat generation element can melt the first fusible metal 21 to fuse the fuse element 25.

EXAMPLES

Fuse element 10 in Example 1 according to the present disclosure is composed of a composite metal material in which the first fusible metal 11 formed as an alloy plate of a 70 Sn-30 Ag alloy having a thickness of 80 μm (having a liquidus temperature of 415° C. and a solidus temperature of 221° C.) and the second fusible metal 12 formed as an alloy plate of a 60 Sn-40 Bi alloy having a thickness of 10 μm (having a liquidus temperature of 175° C. and a solidus temperature of 139° C.) are stacked by cladding as shown in FIG. 1A.

In addition, for fuse element 10 shown in FIG. 1A, a composite metal material in which the first fusible metal 11 formed as an alloy plate of a 67 Sn-33 Ag alloy having a thickness of 65 μm (having a liquidus temperature of 416° C. and a solidus temperature of 220° C.) and the second fusible metal 12 formed as an alloy plate of a 30 Sn-70 Bi alloy having a thickness of 25 μm (having a liquidus temperature of 173° C. and a solidus temperature of 139° C.) are stacked by cladding can also be used.

Fuse element 15 in Example 2 according to the present disclosure is composed of a three-layered composite metal material in which the second fusible metal 12 formed as an alloy plate of a 60 Sn-40 Bi alloy having a thickness of 5 μm (having a liquidus temperature of 175° C. and a solidus temperature of 139° C.) is stacked by cladding on upper and lower surfaces of the first fusible metal 11 formed as an alloy plate of a 80 Sn-20 Ag alloy having a thickness of 80 μm (having a liquidus temperature of 370° C. and a solidus temperature of 221° C.) as shown in FIG. 1B. By providing the second fusible metal 12 on the upper and lower surfaces of the first fusible metal 11, front and rear sides of the fuse element 15 do not have to be distinguished from each other.

Therefore, erroneous placement of a fuse element plate can be prevented in a process for assembling the protective element.

The fuse element in Example 1 or 2 is joined to electrode 24a composed of an Ag alloy and provided on a surface of the insulating substrate 23 composed of alumina ceramics as shown in FIG. 2 to thereby form the protective element in Example 3 or 4 shown below.

In the protective element, the electrode 24a on the insulating substrate to which joint flux is applied in advance and the second fusible metal 22 of the fuse element 25 are placed in contact with each other. The protective element is placed in a reflow furnace under such conditions as a temperature profile of a remaining heat temperature from 110 to 130° C. and a retention time period of 70 seconds, with the retention time period at a temperature equal to or higher than 150° C. being set to 30 seconds and a peak temperature being set to 170° C. Some of the first fusible metal 21 is thus molten and some or all of the second fusible metal 22 is molten, so that an Sn phase, Sn being an element in common to the first and second fusible metals, is mutually diffused and is close to the equilibrium state. At the same time, the molten second fusible metal 22 joins the fuse element 25 to the electrode 24a. After the fuse element 25 is joined to the electrode 24a, the fusing flux is applied to the fuse element 25. The fuse element 25 together with the insulating substrate 23 is covered with a cap-shaped lid 26 made of a heat-resistant plastic and the cap-shaped lid 26 and the insulating substrate 23 are fixed with an epoxy-based resin to thereby make up protective element 20.

Figure 3A:
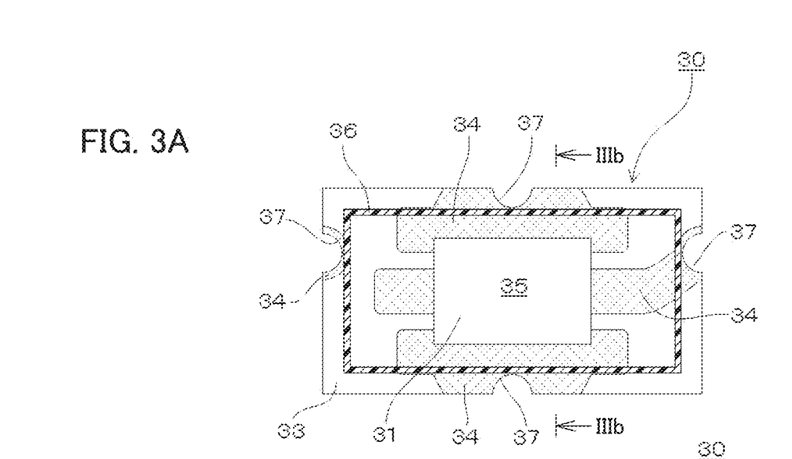
FIGS. 3A to 3C show the protective element according to an embodiment of the present disclosure, with FIG. 3A showing a cross-sectional view along IIIa-IIIc in FIG. 3B, FIG. 3B showing a cross-sectional view along IIIb-IIIb in FIGS. 3A, and 3C showing a bottom view.
Figure 3B:
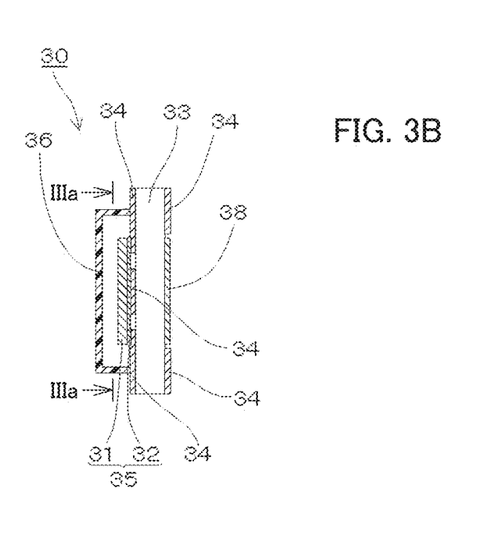
Figure 3C:
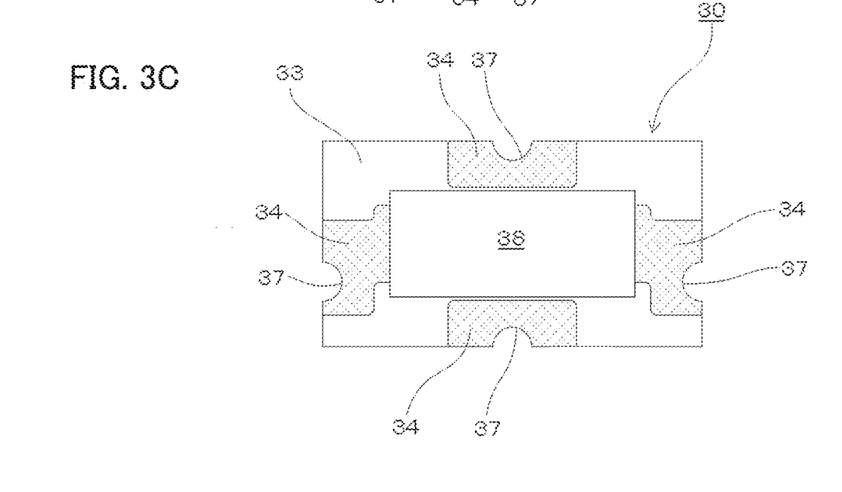

The protective element in Example 3 according to the present disclosure is a protective element 30 including the fuse element in Example 1 or 2, and includes an insulating substrate 33 composed of alumina ceramics, a plurality of pattern electrodes 34 composed of an Ag alloy and provided on upper and lower surfaces of the insulating substrate 33, a resistive heat generation element 38 electrically connected to pattern electrode 34 and provided on the lower surface of the insulating substrate 33, a fuse element 35 electrically connected to the pattern electrode 34 on the upper surface of the insulating substrate 33, and a cap-shaped lid 36 that covers the fuse element 35 from above and secured to the insulating substrate, and is composed of a liquid crystal polymer as shown in FIGS. 3A to 3C. The fuse element 35 is composed of a composite metal material in which a first fusible metal 31 formed as an alloy plate of a 70 Sn-30 Ag alloy having a thickness of 80 μm (having a liquidus temperature of 415° C. and a solidus temperature of 221° C.) and a second fusible metal 32 formed as an alloy plate of a 60 Sn-40 Bi alloy having a thickness of 10 μm (having a liquidus temperature of 175° C. and a solidus temperature of 139° C.) are stacked by cladding. Pattern electrode 34 includes a half through hole 37 made of an Ag alloy, the half through hole allowing electrical connection between pattern electrodes 34 on the upper and lower surfaces of the substrate.

Though not particularly shown, an overglaze composed of a glass material is provided on a surface of the resistive heat generation element in Example 3. The heat generation element 38 of the protective element in Example 3 is provided on a substrate surface (lower surface) of the insulating substrate 33 which is different from a substrate surface (upper surface) on which the fuse element 35 is provided.

The heat generation element 38 employed in Example 3 has a peak temperature, for example, of 430° C., and hence it is higher than 415° C. which is the liquidus temperature of first fusible metal 31, and higher than 175° C. which is the liquidus temperature of the second fusible metal 32. Thus, even though the first fusible metal 31 remains without being molten in the second fusible metal 32, the first fusible metal 31 is molten by heat from the heat generation element 38. Consequently, a defective operation of the protective element can be avoided.

Figure 4A:
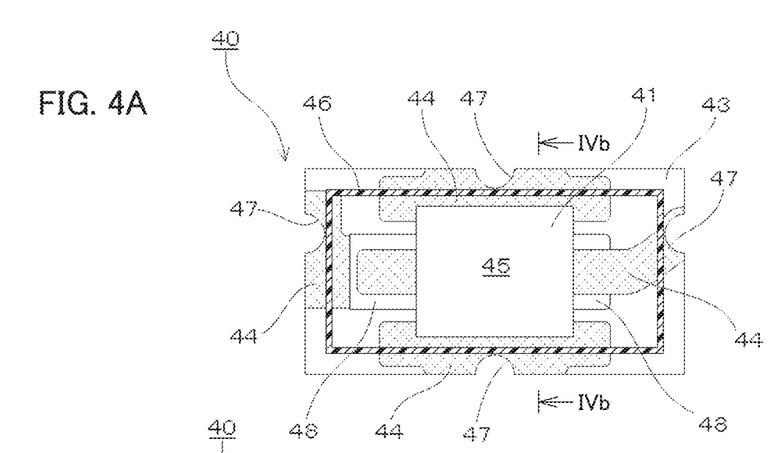
FIGS. 4A to 4C show the protective element according to an embodiment of the present disclosure, with FIG. 4A a cross-sectional view along IVa-IVa in FIG. 4B, FIG. 4B showing a cross-sectional view along IVb-IVb in FIG. 4A, and FIG. 4C showing a bottom view.
Figure 4B:
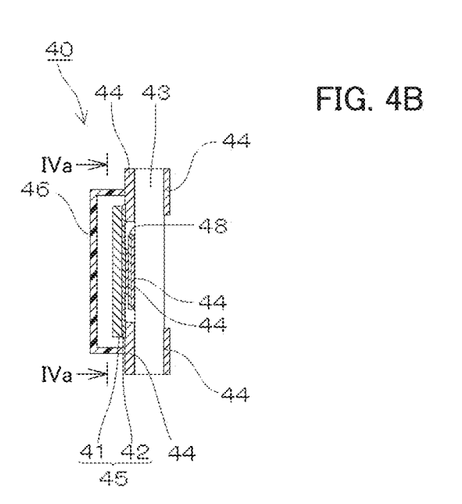
Figure 4C:
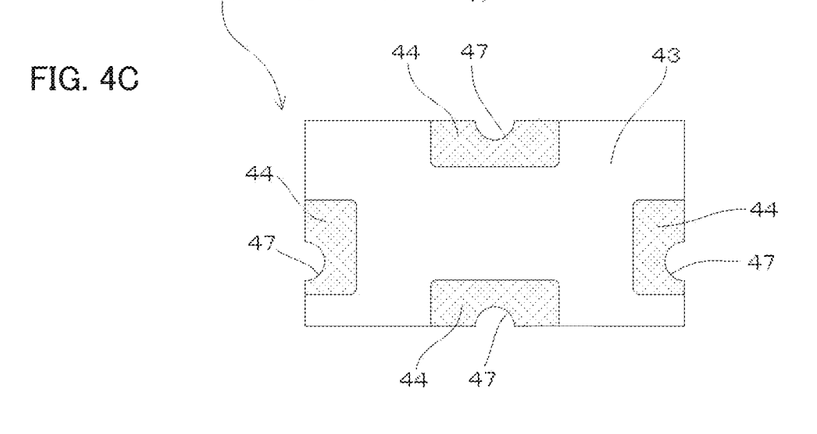

A protective element 40 in Example 4 according to the present disclosure is a modification of the protective element in Example 3 and it is a protective element including the fuse element in Example 1 or 2. As shown in FIGS. 4A to 4C, the protective element includes an insulating substrate 43 composed of alumina ceramics, a plurality of pattern electrodes 44 composed of an Ag alloy and provided on upper and lower surfaces of the insulating substrate 43, a resistive heat generation element 48 electrically connected to pattern electrode 44 and provided on the upper surface of the insulating substrate 43, a fuse element 45 abutting the resistive heat generation element 48 and electrically connected to pattern electrode 44 on the upper surface of insulating substrate 43, and a cap-shaped lid 46 that covers fuse element 45 from above and secured to insulating substrate 43, and is composed of a liquid crystal polymer.

The fuse element 45 is composed of a composite metal material in which a first fusible metal 41 formed as an alloy plate of an 80 Sn-20 Ag alloy having a thickness of 80 μm (having a liquidus temperature of 370° C. and a solidus temperature of 221° C.) and a second fusible metal 42 formed as an alloy plate of a 60 Sn-40 Bi alloy having a thickness of 10 μm (having a liquidus temperature of 175° C. and a solidus temperature of 139° C.) are stacked by cladding. Pattern electrode 44 includes a half through hole 47 made of an Ag alloy, the half through hole allowing electrical connection between pattern electrodes 44 on the upper and lower surfaces of the substrate.

The heat generation element 48 employed in Example 4 has a peak temperature, for example, of 400° C., and hence it is higher than 370° C. which is the liquidus temperature of the first fusible metal 41 and higher than 175° C. which is the liquidus temperature of the second fusible metal 42. Thus, even though the first fusible metal 41 remains without being molten in the second fusible metal 42, the first fusible metal 41 is molten by the heat from the heat generation element 48. Consequently, a defective operation of the protective element can be avoided.

Though not particularly shown, an overglaze composed of a glass material is provided on a surface of the resistive heat generation element 48 in Example 4. The heat generation element 48 of the protective element in Example 4 is provided on a substrate surface (upper surface) of the insulating substrate 43, the same as a substrate surface (upper surface) on which fuse element 45 is provided.

In the protective element in Examples 3 and 4, wiring means that electrically connects the pattern electrodes on the upper and lower surfaces of the insulating substrate to each other may be changed to a conductor through hole that passes through the substrate or a surface wire formed by a planar electrode pattern instead of the half through hole.

In order to improve wettability to an electrode, the Sn—Bi alloy that makes up the second fusible metal in Examples 1 to 4 may be changed to an Sn—Bi—Ag alloy obtained by further adding Ag to the Sn—Bi alloy.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

A fuse element composed of a composite metal material according to the present invention can be incorporated in and mounted on a protective element by heating and melting of the entirety thereof, such as reflow. The protective element including the fuse element can be used for a protection device for a secondary battery such as a battery pack, as being soldered to and mounted on an electrical circuit substrate together with other surface mount devices again by reflow soldering.

REFERENCE SIGNS LIST 10, 15, 25, 35, 45 fuse element; 11, 21, 31, 41 first fusible metal; 12, 22, 32, 42 second fusible metal; 20, 30, 40 protective element; 23, 33, 43 insulating substrate; 24 a, 24 b, 34, 44 electrode; 26, 36, 46 lid; 37, 47 half through hole; 38, 48 heat generation element.

The invention claimed is:

1. A fuse element comprising:
a composite metal material including a first fusible metal and a second fusible metal, the second fusible metal having a melt temperature lower than a melt temperature of the first fusible metal; wherein
some of an element of the first fusible metal is molten at a reflow temperature, and at least some of an element of the second fusible metal is molten at the reflow temperature;
the first fusible metal is an Sn—Ag alloy containing more than 20 mass % and at most 30 mass % of Ag;
the second fusible metal is an Sn—Bi alloy containing at least 40 mass % and at most 70 mass % of Bi; and
a difference between a liquidus temperature and a solidus temperature of the first fusible metal and the second fusible metal is reduced by equilibrium displacement of Sn between the first fusible metal and the second fusible metal, and mutual diffusion of Ag and Bi between the first fusible metal and the second fusible metal so as to reduce a range of an operating temperature of the fuse element.

2. The fuse element according to claim 1, wherein some or all of Sn is molten at the reflow temperature exceeding the solidus temperature of the second fusible metal and lower than the liquidus temperature of the first fusible metal.

3. The fuse element according to claim 1, wherein the first fusible metal is a 70 Sn-30 Ag alloy.

4. The fuse element according to claim 1, wherein the second fusible metal is a 60 Sn-40 Bi alloy or a 30 Sn-70 Bi alloy.

5. A protective element comprising:
an insulating substrate;
a plurality of electrodes provided on the insulating substrate;
a fuse element electrically connected to any of the plurality of electrodes; and
a heat generation element provided on the insulating substrate to heat and fuse the fuse element; wherein the fuse element comprising:
a first fusible metal and a second fusible metal, the second fusible metal having a melt temperature lower than a melt temperature of the first fusible metal; wherein
some of an element of the first fusible metal is molten at a reflow temperature, and at least some of an element of the second fusible metal is molten at the reflow temperature;
the first fusible metal is an Sn—Ag alloy containing more than 20 mass % and at most 30 mass % of Ag;
the second fusible metal is an Sn—Bi alloy containing at least 40 mass % and at most 70 mass % of Bi; and
a difference between a liquidus temperature and a solidus temperature of the first fusible metal and the second fusible metal is reduced by equilibrium displacement of Sn between the first fusible metal and the second fusible metal, and mutual diffusion of Ag and Bi between the first fusible metal and the second fusible metal so as to reduce a range of an operating temperature of the fuse element.

6. The protective element according to claim 5, wherein the heat generation element is provided on a surface of the insulating substrate different from a surface where the fuse element is provided.

7. The protective element according to claim 5, wherein the heat generation element is provided on a surface of the insulating substrate the same as a surface where the fuse element is provided.

8. The protective element according to claim 5, wherein some or all of Sn is molten at the reflow temperature exceeding a solidus temperature of the second fusible metal and lower than a liquidus temperature of the first fusible metal.

9. The protective element according to claim 5, wherein the first fusible metal is a 70 Sn-30 Ag alloy.

10. The protective element according to claim 5, wherein the second fusible metal is a 60 Sn-40 Bi alloy or a 30 Sn-70 Bi alloy.

11. The protective element according to claim 5, wherein a liquidus temperature of the first fusible metal is lower than a peak temperature of the heat generation element.

* * * * *